United States Patent Office 3,438,178
Patented Apr. 15, 1969

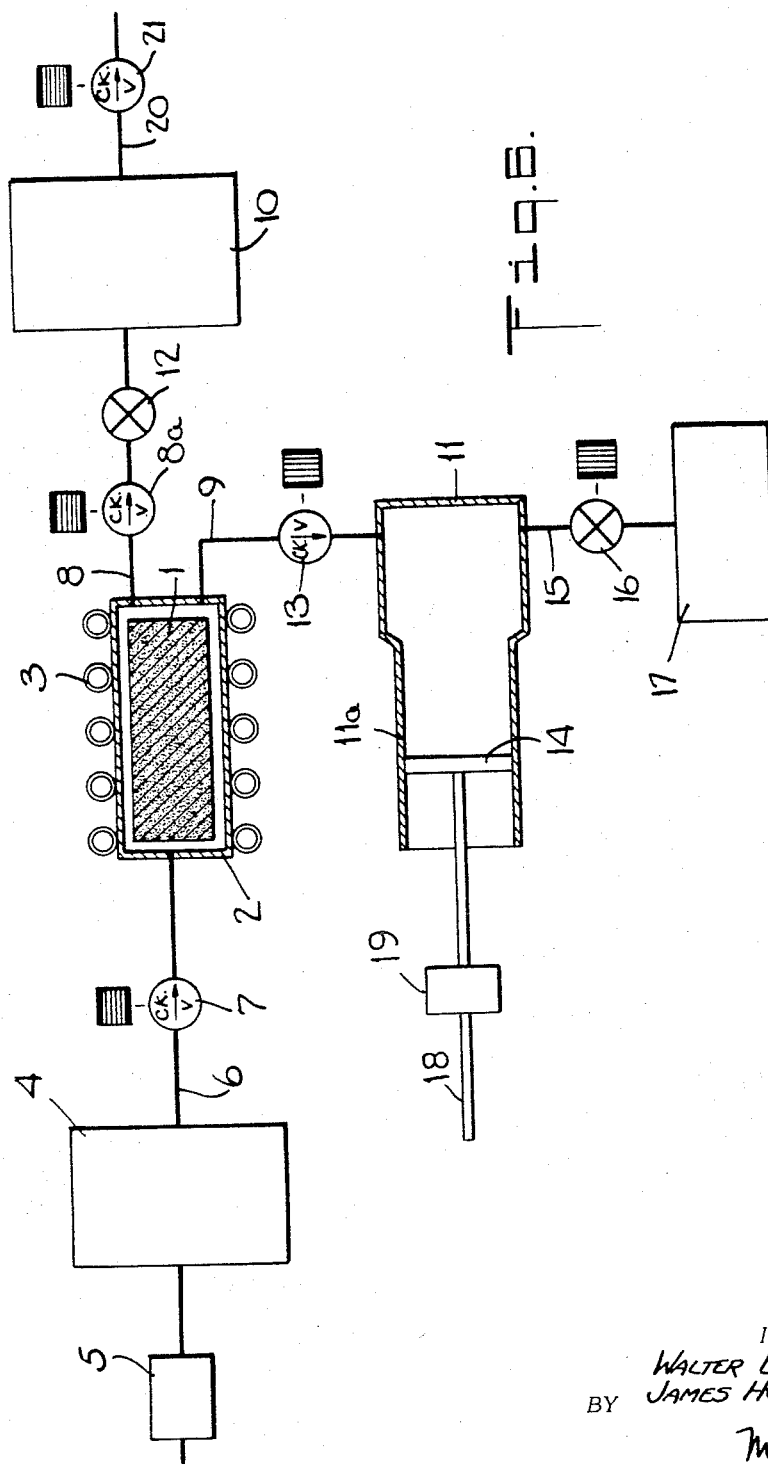

3,438,178
SEPARATION OF HYDROGEN FROM OTHER GASES
Walter Betteridge, Beckenham, and James Hope, Ickenham, England, assignors to The International Nickel Company, Inc., New York, N.Y., a corporation of Delaware
Continuation-in-part of application Ser. No. 577,328, Sept. 6, 1966. This application Apr. 22, 1968, Ser. No. 723,017
Claims priority, application Great Britain, Sept. 6, 1965, 37,950/65; Nov. 26, 1965, 50,388/65; Mar. 6, 1968, 10,929/68
The portion of the term of the patent subsequent to Oct. 22, 1985, has been disclaimed
Int. Cl. C01b 1/32; B01d 53/00
U.S. Cl. 55—58        19 Claims

ABSTRACT OF THE DISCLOSURE

Hydrogen is separated from gaseous mixture by process comprising selective absorption of hydrogen into particulate palladium at elevated temperature and pressure, removing gases other than hydrogen from around the palladium, thereafter decreasing the pressure around the palladium to desorb hydrogen from the palladium and collecting the desorbed hydrogen.

---

This application is a continuation-in-part of our U.S. application Ser. No. 577,328, filed Sept. 6, 1966, and now abandoned.

The present invention relates to separation of hydrogen from gaseous mixtures comprising hydrogen and, more particularly, to processes for providing purified hydrogen.

It is well known that substantially pure hydrogen, a gas which is of increasing importance industrially, may be obtained by separating hydrogen from other gases with which it is associated during its production on an industrial scale or by removing hydrogen from other gases with which it may become contaminated. It is clear that means for readily separating hydrogen from other gases are of considerable importance to industry.

It is also known that hydrogen may be separated from other gases by causing the hydrogen to diffuse through a palladium membrane. It is usual in such processes to work at a temperature of about 400° C. and an inlet pressure of many atmospheres. It is further known that hydrogen absorbed at low temperature in palladium will desorb at higher temperature.

While some success has heretofore been achieved in purifying hydrogen, a need exists for a new economical process for separating hydrogen from gaseous mixtures inasmuch as prior processes have suffered from difficulties and/or disadvantages due to various undesirable factors, such as low efficiency, slow rates of separation or high costs of providing and/or maintaining the processing apparatus. Although many attempts were made to provide processes for separating hydrogen from other gases, none, as far as we are aware, was entirely successful and wholly satisfactory when carried into practice commercially on an industrial scale.

It has now been discovered that a new process provides satisfactory economical separation of hydrogen from mixtures with other gases.

It is an object of the present invention to provide a process for separation of hydrogen from gaseous mixtures comprising hydrogen.

A further object of the invention is to provide a process for recovery of substantially pure hydrogen from industrial gas mixtures.

Other objects and advantages of the invention will become apparent from the following description taken in conjunction with the accompanying drawing in which:

FIGURE 6 is a schematic drawing depicting an apparatus for carrying out the process of the invention.

Generally speaking the present invention is directed to a hydrogen separation and/or purification process comprising contacting particulate palladium, which can be palladium sponge or palladium powder, with a gaseous mixture of hydrogen and other gases under conditions of elevated temperature and pressure effective for obtaining rapid and selective absorption of hydrogen by the palladium, moving the unabsorbed gases away from the palladium and thereafter lowering the pressure of the atmosphere surrounding the palladium to thereby desorb hydrogen from the palladium and thereafter collecting the desorbed hydrogen.

In the present invention it has been surprisingly found that the rate of adsorption of hydrogen in, and desorption of it from, palladium is markedly affected by the pressure and that if the pressure exceeds a specially controlled value which depends upon the temperature, the rate of absorption by a mass of palladium particles is very rapid and, furthermore, on reduction of the pressure to a low value the rate of desorption, though not so high as that of absorption, is also rapid.

Figure 1:
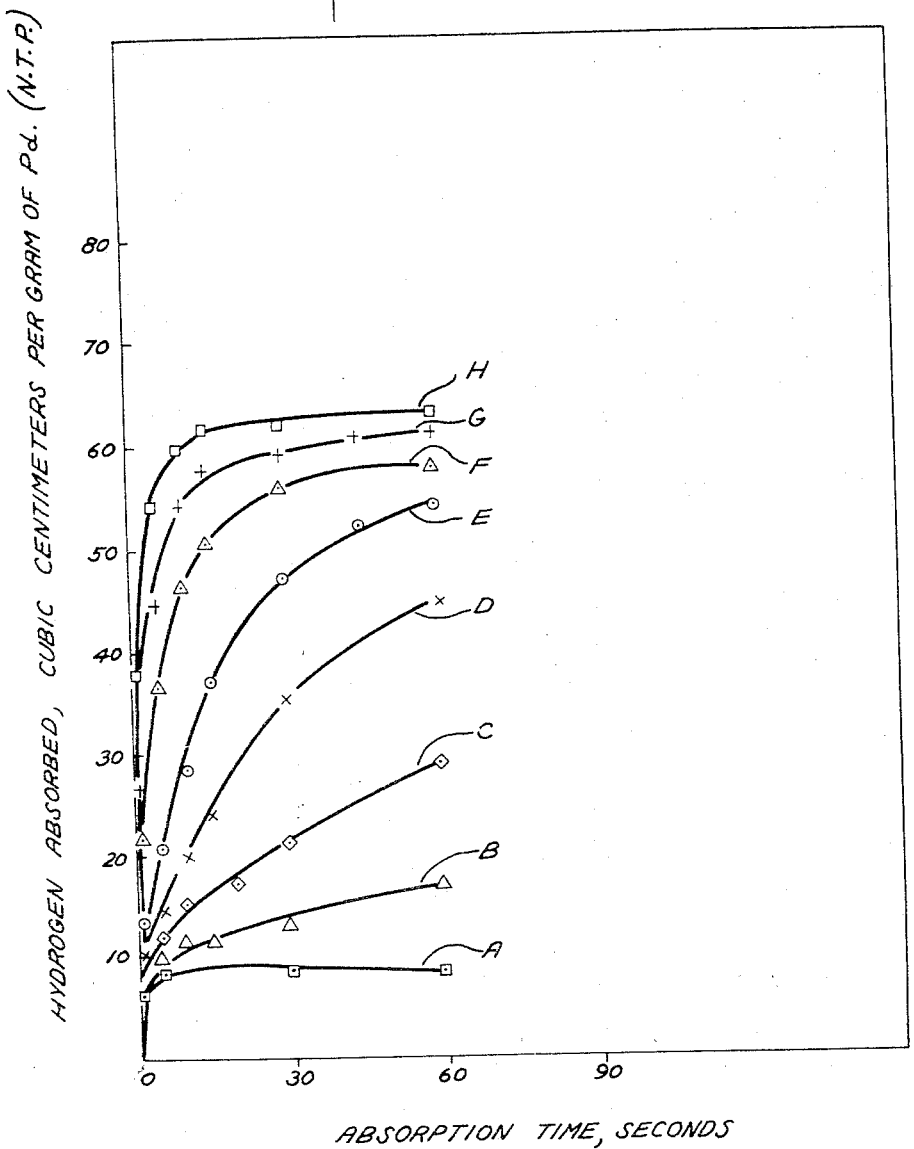
FIGURES 1 through 5 are graphical plots illustrating absorption and/or desorption of hydrogen by palladium.

These discoveries are illustrated by FIGURES 1 to 5 of the accompanying drawings, which are graphs having time in seconds as their abscissae and volumes of hydrogen in cubic centimeters per gram of palladium as their ordinates, the volumes of hydrogen being measured at normal pressure and temperature. FIGURE 1 shows the absorption of hydrogen by palladium of bulk density 4.7 g./cm.$^3$ at 200° C. under different pressures, as follows:

| Curve: | Pressure in atmospheres |
|---|---|
| A | 4.4 |
| B | 5.1 |
| C | 6.1 |
| D | 6.5 |
| E | 7.8 |
| F | 11.2 |
| G | 14.6 |
| H | 21.4 |

It will be seen that at 200° C. the absorption is rapid when the pressure reaches 7.8 atmospheres (curve E) but it is very rapid at 11.2 atmospheres (curve F) and even more rapid at higher pressure (curves G and H).

Figure 2:
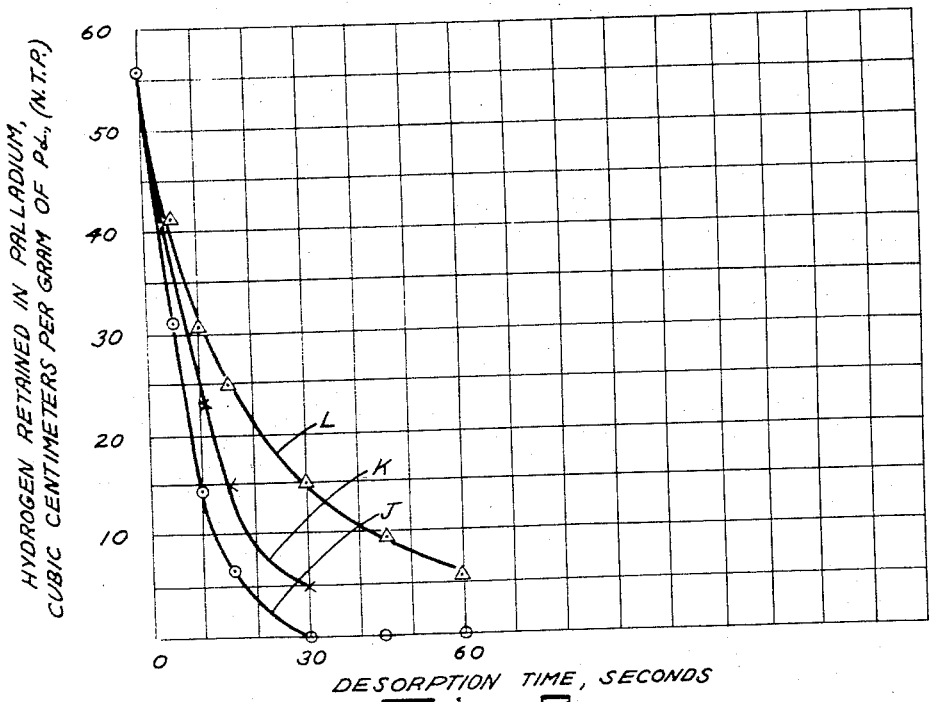

FIGURE 2 shows how the amount of hydrogen retained in palladium decreases with time when the pressure is suddenly reduced from that of absorption to a low value. The curves in this figure relate to hydrogen absorbed at 200° C. under a pressure of 14.6 atmospheres in palladium of bulk density of 6.7 grams per cubic centimeter (g./cm.$^3$), the volume of absorbed hydrogen being 56 cc. per gram in 30 seconds. The low values to which the pressure was reduced for desorption were vacuum (curve J) 1 atmosphere (curve K) and 2 atmospheres (curve L). It will be seen that in each case the rate of desorption is initially rapid and then decreases considerably.

In view of these discoveries, the invention comprises a cyclic process in which a gaseous mixture from which hydrogen is to be separated is brought into contact with palladium sponge or palladium powder in a container under such conditions of pressure and temperature that the hydrogen is rapidly absorbed by the palladium, unabsorbed gases are discharged from the container, and the container is put in communication with a receiver at low pressure so that the hydrogen is desorbed into the receiver.

The cycle of absorption and the desorption are very short, indeed measured in seconds, when the pressures of the absorption and desorption steps are appropriately chosen in accordance with the invention. Ideally in practice the cycle should be less than 60 seconds, advantageously less than 30 seconds. The lower the temperature of absorption, the lower need the pressure be in order that a volume of hydrogen approaching that of saturation may be absorbed, but the less also is the rate of desorption even under vacuum. This is shown by FIGURE 3, which again shows how the volume of hydrogen retained in palladium decreases with time, but in which the curves relate to different temperatures of absorption with decrease from 14.6 atmospheres to 1 atmosphere in each case. The curves in this figure were obtained after palladium of bulk density 2.5 g./cm.$^3$ had absorbed hydrogen for only 5 seconds, with the result that the volume of hydrogen absorbed was low at 240° C. and not much higher at 205° C., but at these high temperatures was substantially all desorbed very rapidly. Curve M shows the desorption at 170° C., curve N at 205° C., curve P at 225° C. and curve R at 240° C.

Figure 3:
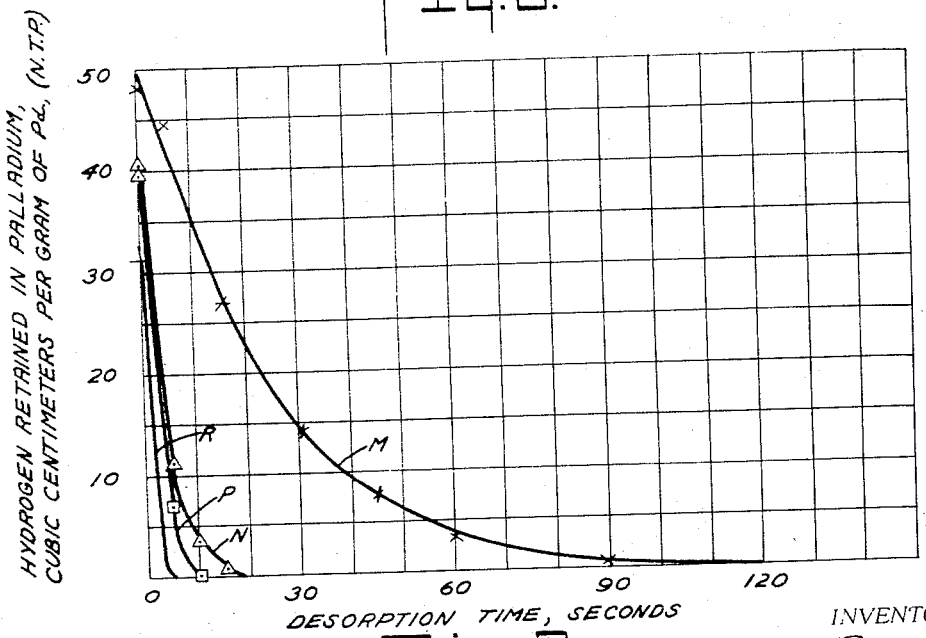

The most effective use of the discoveries is made when both absorption and desorption take place under such conditions and for such a time as to correspond to the steep parts of curves in graphs of the kind shown in FIGURES 1 to 3. It follows that no attempt should be made to reach saturation on absorption, nor to desorb all the absorbed hydrogen. To ensure adequately rapid desorption it is advantageous to work at temperatures of at least 170° C. The temperature may, however, be much lower, say 115° C., at the cost of slower desorption, and therefore a longer cycle. To ensure that the volume of hydrogen absorbed is high without using exceptionaolly high pressure, it is beneficial not to exceed 250° C. An especially advantageous temperature is 200° C. At this temperature rapid desorption takes place on reduction to atmospheric pressure, thus avoiding the need for vacuum equipment.

The pressures referred to above are absolute, the various curves having been derived from results obtained using pure hydrogen. In the process according to the invention, it is of course the partial pressure of hydrogen which is the determining factor.

Figure 4:
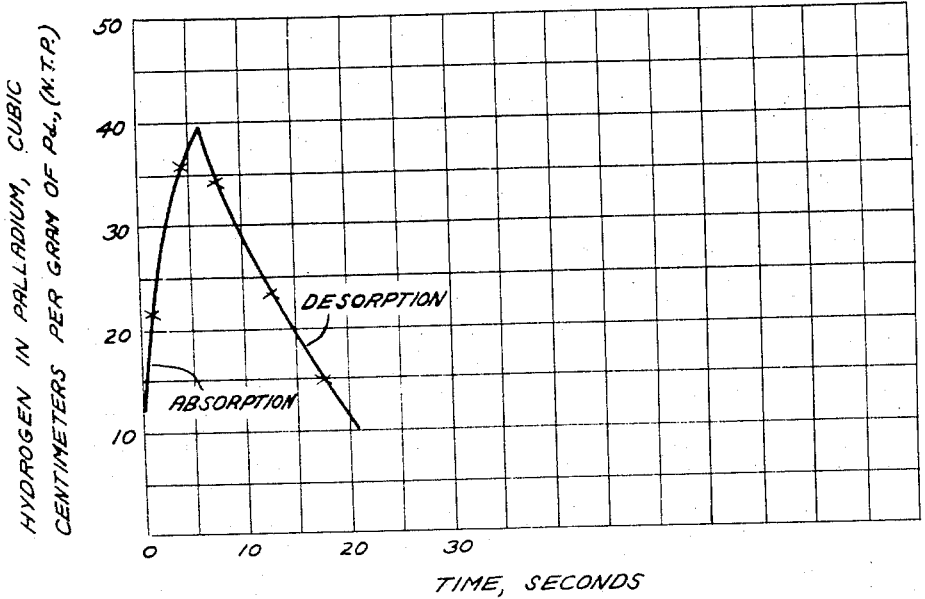

FIGURE 4 shows the curves of absorption and desorption when hydrogen is absorbed by palladium of bulk density 4.7 gms./cm.$^3$ from a mixture of gases under the especially advantageous conditions of absorption at a hydrogen partial pressure of 12 atmospheres and a temperature of 200° C. and desorbed by reduction of the pressure to atmospheric. It will be seen it is possible to absorb hydrogen very rapidly from an initial volume of 10 cubic centimeters per gram (cc./g.) to a volume of 40 cc./g. in 6 seconds, and that desorption to a retained volume of 10 cc./g. takes 14.5 seconds with a total time for the cycle of 20.5 seconds.

Figure 5:
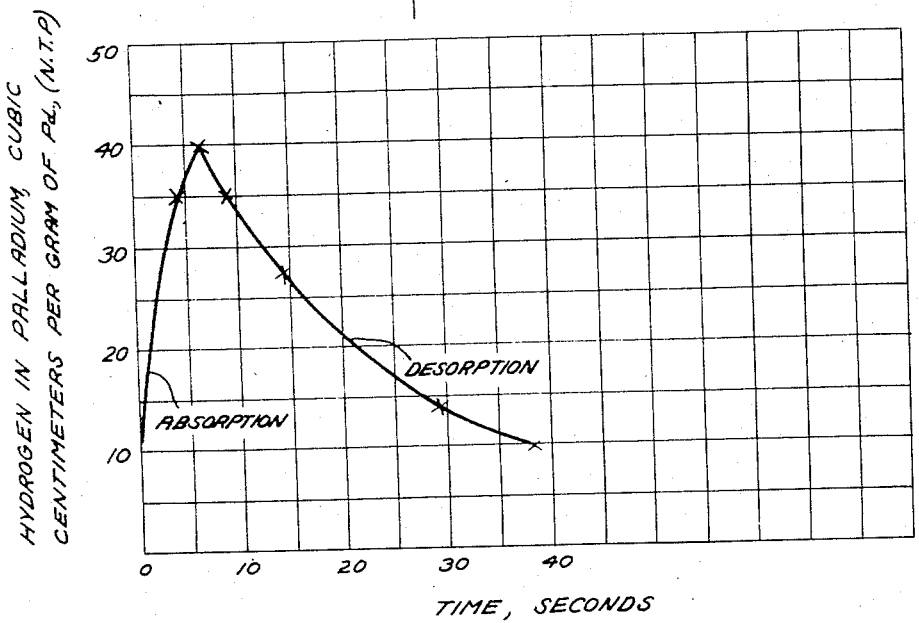

FIGURE 5 is a graph relating to conditions, e.g., palladium density and absorption and desorption pressures, similar to those pertaining to FIGURE 4 except that it relates to an absorption temperature of 170° C. It will be seen that the same absorption of 40 cc./g. from 10 cc./g. can be achieved in 6 seconds with desorption to 10 cc./g. in 32 seconds with a total time for the cycle of 38 seconds.

The palladium sponge or powder should have a large surface area per unit volume, since the smaller the particles, the more rapid the cycle that can be attained. Of course, low bulk densities will readily allow the gas to permeate the mass. It has now been found that variation in the range of bulk density from 2.5 to 10 g./cm.$^3$ has little effect on the rate of absorption but that as the bulk density increases the rate of desorption decreases, particularly at temperatures below 180° C. On the other hand, the lower the bulk density, the greater the dead space which lies between the particles of the mass. This dead space holds the gas from which the hydrogen is separated during absorption and this gas is forced out of the dead space when the hydrogen is desorbed. At higher bulk densities than 10, one approaches the theoretical density of palladium which is 12.02 gms./cm.$^3$. Taking all factors into account it is advantageous when working at a temperature not below 170° C., to use palladium of bulk density from 9 to 10 g./cm.$^3$.

In a palladium mass for the present process, an average particle size of 2.5 microns as measured by the Fisher subsieve sizer is particularly suitable. Palladium sponge prepared by the well-known method of ignition of the pure palladium salt—Pd(NH3)$_2$Cl$_2$ is especially satisfactory. The palladium mass should not be sintered but preferably pressed into a compact at a pressure of 25 tons per square inch.

The palladium in the container must be kept at the desired temperature and it is necessary therefore to supply heat, which can most conveniently be done by surrounding it by a thermostatically controlled electric heater. The absorption of hydrogen in palladium is an exothermic process and the desorption is an endothermic process. There is therefore some variation in the temperature in the container during the cycle, but in practice this should be no more than 10° C.

In the absorption step it is preferred to pass the mixture of gases through the container, hydrogen being absorbed in the process, and to stop the flow after a predetermined time, say less than 20 seconds, e.g., 6 seconds, under advantageous conditions described hereinbefore. At this instant there will, of course, be gas other than hydrogen in the container. If, as is usually the case, the object is to obtain substantially pure hydrogen, this gas must first be removed by scavenging. This can be done by leaving the outlet from the container open after shutting the inlet or by briefly opening a vent to atmosphere thereby to allow a small quantity of absorbed gas to desorb.

The receiver of the separated hydrogen is preferably a container of variable volume so that by increasing its volume it can remain at the desired low pressure during the desorption. It may be, for instance, a cylinder with a piston which can move outwardly against the desired low pressure during desorption and which is moved inwardly again to drive the hydrogen out to a storage vessel.

Not all the hydrogen is absorbed during the passage of the gases through the container, and the gases leaving the container are advantageously passed through a second container and subjected to a similar cycle of absorption and desorption, that is to say, the apparatus is readily used in cascade.

Apparatus in which the invention can be carried out is schematically depicted in FIGURE 6 of the accompanying drawings. In this illustrative apparatus, the palladium in the form of a cylindrical compact of palladium sponge 1 is in a container 2 of stainless steel which is within a thermostatically controlled electric heater 3 so that the temperature of the palladium can be kept substantiallly constant. The mixture of gases to be separated coming from any appropriate source, is fed into a supply vessel 4 by a compressor 5 which is controlled so as to maintain the pressure in the vessel 4 substantially constant. A pipe 6 controlled by a valve 7 connects the vessel 4 to the container 2. The container 2 has two outlet pipes 8 and 9 leading respectively to a vessel 10 and a receiver 11. The gases from which hydrogen is separated in the container 2 pass to the vessel 10 through the pipe 8, which is controlled by a non-return valve 8a and a flow-control valve 12. In operation, the valve 12 is set to control the flow from the vessel 4 at an appropriate rate and the valve 8a is opened and closed as required in the course of the cycle of absorption and desorption. The hydrogen desorbed flows to the receiver 11 through the pipe 9, which is controlled by valve 13. The receiver 11 comprises a cylinder 11a in which a piston 14 works. The inlet from the pipe 9 is close to a closed end of this cylinder 11a so that when valve 13 is opened hydrogen desorbed from the palladium 1 immediately enters the cylinder 11a and acts on the front face of the piston 14, the back face of which is exposed to atmospheric pressure. The hydrogen drives the piston before it. An outlet pipe 15, controlled by a valve 16, runs from the cylinder to a hydrogen-storage vessel 17. A rod 18 of the piston 14 is connected to an electrically operable cam-activated device 19 which, when actuated, forces the piston into the cylinder 11a thus driving hydrogen before it through the pipe 16 into the vessel 17.

The vessel 10 has an outlet pipe 20 which is controlled by a valve 21 and leads to a container (not shown) coupled to a compressor (not shown) similar and operated in cascade by introducing the gas to a vessel similar to 4 and a container similar to 2.

All the valves except the valve 12 are solenoid-controlled.

In a cycle of operations the valves 7, 8a and 21 are opened during the absorption stage while the valve 13 is shut. After a predetermined time, which of course is set on a controller of the electrical operation, the valve 7 is shut. Under the pressure prevailing in the container 2 gases continue to pass through pipe 8, and in a very short time the dead space inside the container is effectively purged of gas other than hydrogen. Next the valve 8a is shut and the valve 13 opened, with the result that desorption takes place into the receiver 11 while the piston 14 moves rearwardly as previously described. At this stage valve 16 is of course shut. At the end of the predetermined period of desorption the valves are set again for absorption, the valve 16 is opened and the device 19 is actuated.

For the purpose of giving those skilled in the art a better understanding of the invention and/or a better appreciation of the advantages of the invention, the following illustrative examples are given:

*Example I*

This example shows that the process of the invention is operative at low temperature although, of course, the time cycle is long when the temperature is low. In this example, a mixture of 25% hydrogen and 75% nitrogen was introduced under pressure into the container 2, which contained 19.7 grams of palladium sponge of average particle diameter 2.5 microns and bulk density 2.5 gm./cm.$^3$. The container was heated to a temperature of 115° C. and the gases were supplied under a pressure of 14.6 atmospheres, the partial pressure of the hydrogen thus being 3.7 atmospheres. The valve 12 was set so that this pressure was maintained while the gas mixture flowed through the container at a rate of 2.5 liters per minute for one minute. The hydrogen was desorbed not into the receiver 11 but into an initially evacuated receiver for a period of one minute. The volume of gas desorbed was 650 cm.$^3$ with a purity of 90% hydrogen.

*Example II*

A mixture of 75% hydrogen and 25% nitrogen was introduced into the container 2, which contained palladium prepared by hydrostatically pressing palladium sponge (Fisher particle size 11 microns) at 25 tons per square inch into the form of a cylinder 6.6 cm. long and 1.2 cm. diameter. The weight of the palladium cylinder was 72.8 grams and its bulk density 9.3 grams per cubic centimeter, and the dead space volume was 1.76 cubic centimeters. The hydrogen was absorbed at a pressure of 34 atmospheres (the hydrogen partial pressure being 25.5 atmospheres) and a temperature of 230° C. for a time of 7 seconds. The volume of gas passed through the container was 1.67 liters NTP and 0.38 liter NTP entered the vessel 10. The calculated volume of gas in the dead space of the core was 35 cubic centimeters. With the valves 7 and 13 closed the gas pressure in the container was allowed to fall for a time less than half a second to allow the gas in the dead space to escape and the volume of this gas was 0.12 liter NTP. Desorption took place into the receiver 17 at atmospheric pressure of for a time of 10 seconds. The volume of hydrogen desorbed was 1.17 liters NTP or 16.1 cubic centimeters of hydrogen per gram of palladium.

Particulate palladium employed for absorbing and desorbing hydrogen in the process of the invention can be in the form of sponge, powder or a palladium-containing coating on inert particles and can be present as highly pure, commercially pure or alloyed palladium. Alloyed palladium for the present process particularly includes palladium-containing metals wherein the palladium is combined in a high palladium alloy consisting essentially of at least about 70% palladium and one or more of the following alloying ingredients: up to about 30% silver, up to about 30% gold, up to about 1% boron, up to about 10% copper, up to about 10% nickel, up to about 10% ruthenium, up to about 10% platinum and up to about 10% rhodium. Of course, inasmuch as the capability of palladium to selectively absorb hydrogen under pressure and to desorb hydrogen at a pressure lower than the absorption pressure goes to the essence of the invention it will be understood that for purposes of the present invention alloys consisting essentially of palladium and other elements are essentially devoid of ingredients which, if present, would annul or greatly harm the herein required absorption and desorption characteristics. In general, the invention can be practiced with palladium-rich metals comprising at least about 70% and up to 100% palladium and characterized by a pressure-dependent selective solubility for hydrogen that increases with an increase in the partial pressure of hydrogen in the atmosphere in contact with the palladium-rich metal.

When employing alloyed palladium, it is much preferred to use binary alloys and especially the alloys of palladium and silver. Palladium-silver alloys are more permeable to hydrogen than pure palladium but the solubility of hydrogen in the alloy is reduced with increase of silver. For advantageously balancing these opposing factors and obtaining a high rate of hydrogen output the particulate palladium in the present process is made of an alloy consisting of about 5% silver and balance essentially palladium (about 95% palladium).

Inasmuch as palladium is a very expensive metal, the addition of silver, gold, boron, copper or nickel thereto reduces the cost of the powder, so that economic advantages accrue in the overall cost of the hydrogen produced per cubic centimeter of the particulate palladium in use.

The alloys in powder form may be made by a variety of methods. For example, palladium-gold or palladium-silver may conveniently be made by precipitation from an aqueous solution of complex salts. Any of the alloys may be made by melting and casting, the alloy than being comminuted to form fine particles, advantageously particles having an average particle size of 2.5 microns as measured by the Fisher sub-sieve sizer.

Inert particles, for example, alumina or thoria, may be coated with palladium by, for example, immersing them in a bath of a palladium salt such as sodium chloropalladite and reducing the salt, for example with hydrazine, to precipitate palladium on the particles.

Inert particles may be coated with an alloy by first coating them with palladium and then with another metal, e.g. by barrel plating, and subsequently heating to bring about diffusion. Again, the constitutents of an alloy may be codeposited by the reduction of a bath of, for example, aminechlorides of palladium and silver in which the inert particles are immersed.

The present invention is applicable to the recovery of substantially pure hydrogen from numerous gases produced industrially, for instance, the purge gas in ammonia synthesis contains 60 to 70% hydrogen in association with 10% methane, of which the balance is nitrogen. Cracked ammonia, which is widely used in industry, contains approximately 75% hydrogen, 25% nitrogen and in the refining of petroleum some of the residue gases contain 30 to 70% hydrogen of which the balance is mainly saturated hydrocarbon in gaseous form.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A process for separating hydrogen from a gaseous mixture containing hydrogen and at least one other gas comprising contacting particulate palladium with a gaseous mixture of hydrogen and other gas having a pressure elevated above atmospheric pressure in a heated chamber maintained at a temperature in the range of about 115° C. to 250° C., selectively absorbing hydrogen into said particulate palladium, purging the chamber of the gas other than hydrogen, thereafter decreasing the pressure around said particulate palladium in said chamber to thereby desorb hydrogen from said particulate palladium and collecting the desorbed hydrogen.

2. A process as set forth in claim 1 wherein the chamber temperature is maintained at a temperature in the range of about 170° C. to 250° C.

3. A process as set forth in claim 1 in which hydrogen is desorbed at atmospheric pressure.

4. A process as set forth in claim 1 in which hydrogen is desorbed into a receiver of variable volume.

5. A process as set forth in claim 1 in which the particulate palladium is palladium sponge of bulk density from 9 to 10 grams per cubic centimeter.

6. A process as set forth in claim 1 wherein the particulate palladium is compacted palladium powder.

7. A process as set forth in claim 1 in which the particulate palladium is palladium sponge prepared by ignition of the pure palladium salt Pd(NH$_3$)$_2$Cl$_2$.

8. A process as set forth in claim 1 wherein the gaseous mixture from which hydrogen is to be separated is brought into contact with palladium sponge or palladium powder in the chamber under conditions of pressure and temperature of at least 7.8 atmospheres hydrogen partial pressure and 170° C. to 200° C. effective to produce rapid absorption of hydrogen by the palladium and wherein, after the chamber is purged, the chamber pressure is reduced to a low value of from vacuum up to 2 atmospheres to thereby desorb hydrogen from the palladium.

9. A process as set forth in claim 8 wherein the steps of absorption, purging, desorption and collecting are carried out in a time of less than 60 seconds.

10. A process as set forth in claim 8 wherein the steps of absorption, purging, desorption and collecting are carried out in a time of less than 30 seconds.

11. A process as set forth in claim 8 in which the mixture of gases is passed through the chamber, hydrogen being absorbed in the process, the flow is stopped after a predetermined time, the gas in the chamber from which hydrogen has been separated is removed from the chamber, and the chamber is put in communication with a receiver at the low pressure.

12. A process as set forth in claim 1 wherein at least a portion of the palladium is in a palladium-rich alloy containing at least about 70% palladium and characterized by a pressure-dependent selective solubility for hydrogen that increases with an increase in partial pressure of hydrogen in the gas contacting the alloy.

13. A process as set forth in claim 1 wherein at least a portion of the palladium is in the form of a palladium-rich coating on inert particles, said coating containing at least about 70% palladium and being characterized by a pressure-dependent selective solubility for hydrogen that increases with an increase in partial pressure of hydrogen in the gas in contact with said coating.

14. A process as set forth in claim 1 wherein the palladium is in a palladium-rich alloy consisting essentially of at least about 70% palladium with the balance essentially metal from the group consisting of up to about 30% silver, up to about 30% gold, up to about 1% boron, up to about 10% copper, up to about 10% nickel, up to about 10% ruthenium, up to about 10% platinum and up to about 10% rhodium.

15. A process as set forth in claim 14 wherein the palladium-rich alloy is a binary alloy consisting essentially of at least about 70% palladium and the balance essentially silver.

16. A process for separating hydrogen from a gaseous mixture containing hydrogen and at least one other gas comprising contacting paladium-containing particles having outer surfaces of a palladium-rich alloy consisting essentially of at least about 70% palladium and the balance essentially metal selected from the group consisting of up to about 30% silver, up to about 30% gold, up to about 1% boron, up to about 10% copper, up to about 10% nickel, up to about 10% ruthenium, up to about 10% platinum and up to about 10% rhodium with a gaseous mixture of hydrogen and other gas having a pressure elevated above atmospheric pressure in a heated chamber maintained at a temperature in the range of about 115° C. to 250° C., selectively absorbing hydrogen into said palladium-containing particles, purging the chamber of the gas other than hydrogen, thereafter decreasing the pressure around said particles in said chamber to thereby desorb hydrogen from said particles and collecting the desorbed hydrogen.

17. A process as set forth in claim 16 wherein the palladium-containing particles comprise inert particles having coatings thereon of the palladium-rich alloy set forth in said claim 16.

18. A process as set forth in claim 16 wherein the palladium-rich alloy consists essentially of at least about 70% palladium and the balance essentially silver.

19. A process as set forth in claim 16 wherein the palladium-rich alloy consists essentially of about 95% palladium and about 5% silver.

References Cited

UNITED STATES PATENTS

| | | | |
|---|---|---|---|
| 1,794,377 | 3/1931 | Hasche et al. | 55—58 |
| 2,303,111 | 11/1942 | Cuyler et al. | 55—386 |
| 2,773,561 | 12/1956 | Hunter | 55—16 |
| 2,958,391 | 11/1960 | De Rosset | 55—16 |
| 3,104,162 | 9/1963 | Skarstrom | 55—58 |
| 3,121,625 | 2/1964 | Broughton | 55—58 |
| 3,232,026 | 2/1966 | McKinley | 55—16 |

FOREIGN PATENTS 697,318  11/1964  Canada.

REUBEN FRIEDMAN, *Primary Examiner.*

C. N. HART, *Assistant Examiner.*

U.S. Cl. X.R.

55—68, 74

PO-1050
(5/69)

UNITED STATES PATENT OFFICE
CERTIFICATE OF CORRECTION

Patent No. 3,438,178      Dated April 15, 1969

Inventor(s)   WALTER BETTERIDGE & JAMES HOPE

It is certified that error appears in the above-identified patent and that said Letters Patent are hereby corrected as shown below:

Column 1, line 32, delete "abandoned" and insert --U.S. Patent No. 3,406,496--.
      Column 2, line 22, for "adsorption" read --absorption--
      Column 3, line 34, for "exceptionaolly" read --exceptionally--, and, line 71, after "greater" insert --is--.
      Column 7: Delete lines 10 to 59; line 60, for "12" read --1-- and after "process" delete "as set forth in claim 1" and insert --for separating hydrogen from a gaseous mixture containing hydrogen and at least one other gas comprising contacting particulate palladium with a gaseous mixture of hydrogen and other gas having a pressure elevated above atmospheric pressure in a heated chamber maintained at a temperature in the range of about 115°C. to 250°C.,--; line 65, after "alloy", insert --,selectively absorbing hydrogen into said particulate palladium, purging the chamber of the gas other than hydrogen, thereafter decreasing the pressure around said particulate palladium in said chamber to thereby desorb hydrogen from said particulate palladium and collecting the desorbed hydrogen--; and, line 66, for "13" read --2--.
      Column 8: Line 6, for "14" read --3--; line 14, for "15" read --4-- and for "14" read --3--; lines 18, 37, 40, 41 and 44, for "16" read --5--; and, lines 37, 41 and 44, for "17", "18" and "19" read --6--, --7-- and --8--, respectively.

In the heading to the printed specification, line 16, "19 Claims" should read -- 8 Claims --.

SIGNED AND
SEALED

MAY 19 1970

(SEAL)
Attest:

Edward M. Fletcher, Jr.
Attesting Officer

WILLIAM E. SCHUYLER, JR
Commissioner of Patents